United States Patent [19]
Ballard et al.

[11] Patent Number: 5,933,630
[45] Date of Patent: Aug. 3, 1999

[54] PROGRAM LAUNCH ACCELERATION USING RAM CACHE

[75] Inventors: Clinton L. Ballard, Suquamish; Timothy W. Smith, Seattle, both of Wash.

[73] Assignee: Acceleration Software International Corporation, Poulsbo, Wash.

[21] Appl. No.: 08/874,244

[22] Filed: Jun. 13, 1997

[51] Int. Cl.⁶ .................................................. G06F 12/00
[52] U.S. Cl. ............................................................ 395/651
[58] Field of Search .............................. 364/424.01, 200; 395/472, 700, 497.01, 651, 652, 653

[56] References Cited

U.S. PATENT DOCUMENTS

| | | | |
|---|---|---|---|
| 3,514,762 | 5/1970 | Sloane et al. | 340/172.5 |
| 4,052,704 | 10/1977 | Franaszek | 364/900 |
| 4,511,962 | 4/1985 | Machida et al. | 364/200 |
| 4,794,523 | 12/1988 | Adan et al. | 364/200 |
| 5,142,473 | 8/1992 | Davis | 364/424.01 |
| 5,428,758 | 6/1995 | Salsburg | 395/400 |
| 5,442,802 | 8/1995 | Brent et al. | 395/200.08 |
| 5,475,840 | 12/1995 | Nelson et al. | 395/700 |
| 5,581,736 | 12/1996 | Smith | 395/497.01 |
| 5,636,360 | 6/1997 | Courts et al. | 395/472 |

*Primary Examiner*—Hassan Kizou
*Assistant Examiner*—Omar A. Omar
*Attorney, Agent, or Firm*—Steven P. Koda

[57] ABSTRACT

Launch time for a computer program is reduced by logging hard disk accesses during an initial launch, then processing the log file to accelerate subsequent launches. The log file is processed by identifying all the file portions accessed during the launch, eliminating any duplicate cluster accesses, then sorting the remaining accesses. The disk access log entries are sorted by physical address or are grouped by file, then organized by logical address within each group. The processed log file is stored with the application program. When the application program is launched thereafter, the processed log file is accessed first. All the disk accesses in the log file are performed moving all the data into RAM cache. When the program launch resumes, the launch occurs faster because all the data is already in cache.

2 Claims, 4 Drawing Sheets

PROGRAM LAUNCH ACCELERATION USING RAM CACHE

CROSS REFERENCE TO RELATED APPLICATIONS

This invention is related to U.S. patent application Ser. No. 08/656,372 filed May 31, 1996 for Estimating Access Time for Hard Drive I/O Requests; and U.S. patent application Ser. No. 08/839,742 filed Apr. 15, 1997 for Program Launch Acceleration. The content of these applications are incorporated herein by reference and made a part hereof.

BACKGROUND OF THE INVENTION

This invention relates to methods and apparatus for optimizing access to a computer program storage device during program start-up, and more particularly to a method for reducing the time to launch a computer program.

A typical computer system includes at least a processing unit, a display device, a primary storage device (e.g., random access memory—RAM), a secondary storage device (e.g., a disk storage device), a keyboard, and a pointing/clicking device. Once a computer program is installed on the computer the program resides on the secondary storage device. The secondary storage device serves as a large permanent memory space. Exemplary secondary storage devices include a hard disk drive, a floppy disk drive, and a compact disk drive. There are many different types of disks, including magnetic disks, magneto-optical disks, optical disks, and floppy disks. To launch a program that is stored on the secondary memory device portions of the program are accessed and moved to the primary storage device. Conventionally, the primary storage device has a smaller address space and is accessed faster than the secondary storage device. Primary storage device memory space is generally treated as a more precious resource than the memory space of the secondary storage device.

A general purpose personal computer typically has many interactive application computer programs installed. A user is able to start-up multiple programs. With regard to an interactive computer program, the term "launch time", as used herein, means the time from when a processor receives a command to start the computer program until the time that the computer program is ready to accept input commands (e.g., user interface commands, batch-entry commands). The term "launch" as used herein means the process performed during the launch time to start up the computer program and get the computer ready to accept input commands for the computer progra It is common for an application program for a personal computer to be stored in multiple files on the secondary storage device. There often is an executable file, a preferences file and many other files. Some programs include a data base file or a default data file. During a launch of the program multiple files are opened and select portions are moved from the secondary storage device into the primary storage device. When purchasing a computer program the packaging often specifies the amount of RAM address space (i.e., primary storage device address space) required to be allocated to the program while active. By active it is meant that the program has been launched and is currently processing or is currently able to accept input commands.

SUMMARY OF THE INVENTION

According to the invention, launch time for a computer program is reduced by logging hard disk accesses during an initial launch, then processing the log file to accelerate subsequent launches.

According to one aspect of the invention, computer activity is monitored to determine when a computer program is being launched. For a launch for a program that has not yet had its launch time optimized, file access is monitored during the program launch. Such monitoring includes logging file accesses to the secondary storage device occurring during the launch. The cluster address and the time of access are stored in the log.

According to another aspect of the invention, after program launch is complete the launch access log is processed. During a program's launch sequence multiple files are open at a given time. Contents from a first file are accessed, then contents from a second file. As the accesses continue the first file again is accessed. Thus, accesses to the multiple files are interspersed amongst each other. An exemplary sequence might be: File 1 (address 1), File 2 (address 20), File 3 (address 40), File 1 (address 6), File 3 (address 35), File 2 (address (25).

According to another aspect of the invention, the launch access log is processed by identifying all the file portions accessed during the launch, eliminating any duplicate cluster accesses, then sorting the remaining accesses. According to one approach the disk access log entries are sorted by physical address. According to another approach the disk access log entries are grouped by file, then organized by logical address within each group. The processed log file then is stored with the application program.

According to another aspect of the invention, when the application program is launched thereafter, the processed log file is accessed first. All the disk accesses in the log file are performed moving all the data into RAM cache. When the program launch resumes, the launch occurs faster because all the data is already in cache. The net effect is a faster launch time because redundant disk accesses are eliminated and because the disk accesses are arranged in an order to optimize disk access times. These and other aspects and advantages of the invention will be better understood by reference to the following detailed description taken in conjunction with the accompanying drawings.

DESCRIPTION OF SPECIFIC EMBODIMENTS

Overview

Figure 1:
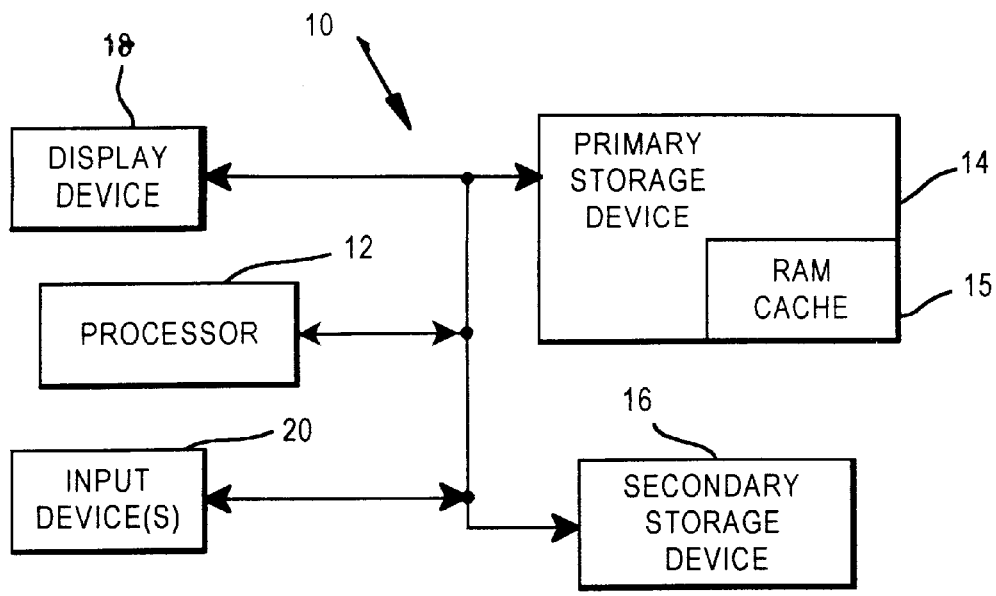
FIG. 1 is a block diagram of a computer system hosting a method embodiment of this invention.

FIG. 1 shows a block diagram of a computer system 10 hosting a method embodiment of this invention. The computer system 10 includes a processor 12, a primary storage device 14, a secondary storage device 16, a display device 18 and one or more input devices 20. In one configuration the computer system is a personal computer, configured in a stand-alone environment or as part of a network. In another configuration the processor 12, primary storage device 14, display device 18 and input devices 20 are part of one computer while the secondary storage device is part of another computer (e.g., server) on a network. In yet another configuration the display 18 and input devices 20 are part of one computer, while the processor, primary storage device and secondary storage device are part of another computer on the network.

The processor 12 serves to execute an operating system and one or more application computer programs. In some embodiments there are multiple processors for executing the operating system and application programs. System utilities and/or operating system extension programs also are executed according to some computer system 10 embodiments. Conventional operating systems include DOS, Windows, Windows NT, MacOS, OS/2 and various UNIX-based operating systems. The display device 18 and input devices 20 enable interaction between a user and the computer system 10. The computer system 10 in the process of executing the operating system and zero or more computer programs defines an operating environment for a user to interact with the computer, operating system and executing computer program. The display device 18 serves as an output device. Exemplary display devices include a CRT monitor or flat panel display. The user inputs commands and data to the computer system 10 via the input devices. Exemplary input devices include a keyboard, a pointing device and a clicking device. Data also is input to the computer via transportable disks or through I/O ports (not shown).

The secondary storage device 16 serves as a permanent storage memory for one or more computer programs 24 to be executed by the processor 12. The secondary storage device 16 also stores data files for use with the application computer programs. Exemplary secondary storage devices include a hard disk drive, floppy disk drive, CD-ROM drive, bernoulli disk drive or other drive system for accessing permanent or replaceable disks, such as floppy disks, magnetic disks, magneto-optical disks, or optical disks.

The primary storage device 14 typically is a storage device having a faster access time than that of the secondary storage device. An exemplary primary storage device 14 is random access memory (RAM). All or a portion of the RAM serves as a RAM cache 15. Portions of a computer program and/or data files are loaded into the RAM cache 15 to speed up execution of the program and processing of data. Mass produced computer software typically include specifications requiring a minimum amount of RAM required to run the program on a given computer system. During a launch sequence for starting such a computer program, portions of the program are copied from the secondary storage device into RAM.

A launch sequence as used herein means the sequence of steps executed by the computer system during the launch time which pertain to starting up a given computer program and getting the computer ready to accept input commands for the computer program. A launch sequence is executed for a computer program. Different computer programs have different launch sequences. Steps included in a launch sequence include copying portions of the computer program being launched from the secondary storage device to the primary storage device. Other steps may include allocating a port or device to serve as an input source and/or output receptor. The method of this invention for accelerating a program launch is directed to improving the speed for accessing the secondary storage device during a launch sequence.

Method for Accelerating Computer Program Launch

Figure 2:
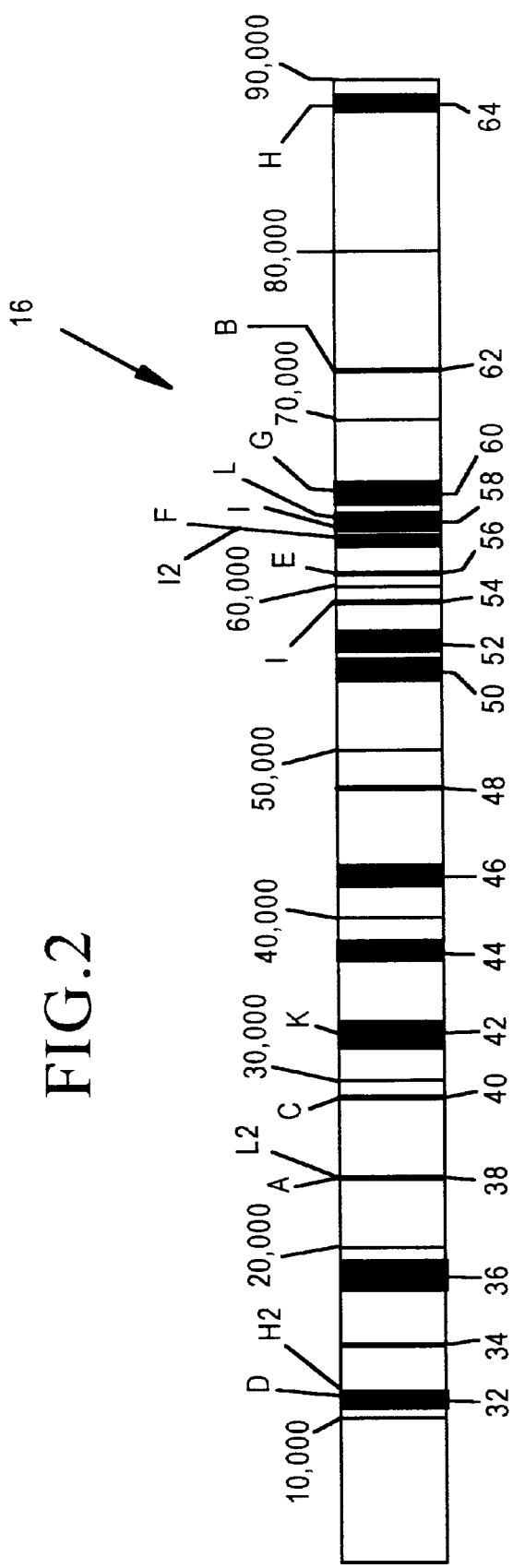
FIG. 2 is a diagram of a portion of the memory address range for the secondary storage device of FIG. I showing the storage locations of a given computer program.

FIG. 2 is a diagram of the secondary storage device 16 address space prior to a given computer program's launch sequence is accelerated. The dark regions indicate areas where contents 32–64 of a computer program 24 are stored. The device 16 also stores other computer programs and data. Address space allocation for such other programs and data is not shown. The computer program 24 includes multiple files. The minimum file system allocation unit is the smallest number of physical addresses that can be read or written to the secondary storage device. Such minimum file allocation unit also is referred to as a memory block or address cluster. When a specific address is specified in a READ call, the block encompassing such address is read from the secondary storage device and stored in the primary storage device. When a specific address is specified in a WRITE call, the block encompassing such address is written from the primary storage device into the secondary storage device. Listed below in table A is an exemplary portion of a file allocation table serving as a cross reference of logical addresses and physical addresses for the computer program (for a media having a cluster size of 10). Part numbers are added to correlate the table with FIG. 2. The logical addresses typically are generated at the time the computer program is compiled. The physical addresses are determined by the operating system when the computer program is installed. The physical addresses are the actual addresses on the secondary storage device 16 where the files are stored. Note that the part number is used to refer to a part of the computer program as distinct from the physical addresses at which such part is stored.

TABLE A

| Program File | Logical Address | Physical Address | Part No. |
|---|---|---|---|
| File 1 | 1–200 | 10010–10200 | 32 |
| File 1 | 210–300 | 24410–24500 | 38 |
| File 1 | 310–1500 | 38110–38300 | 44 |
| File 1 | 510–600 | 48810–48900 | 48 |
| File 1 | 610–800 | 55210–55400 | 50 |
| File 1 | 810–900 | 59010–59100 | 54 |
| File 1 | 910–1000 | 72210–72300 | 62 |
| File 2 | 1010–1300 | 32210–32500 | 42 |
| File 2 | 1310–1500 | 42410–42600 | 46 |
| File 2 | 1510–1600 | 61110–61200 | 56 |
| File 2 | 1610–1800 | 64410–64600 | 60 |
| File 2 | 1810–2000 | 89010–89200 | 64 |
| File 3 | 2010–2100 | 14110–14200 | 34 |
| File 3 | 2110–2400 | 18610–18900 | 36 |
| File 3 | 2410–2500 | 29110–29200 | 40 |
| File 3 | 2510–2700 | 56210–56400 | 52 |
| File 3 | 2710–3000 | 63010–63300 | 58 |

Figure 3:
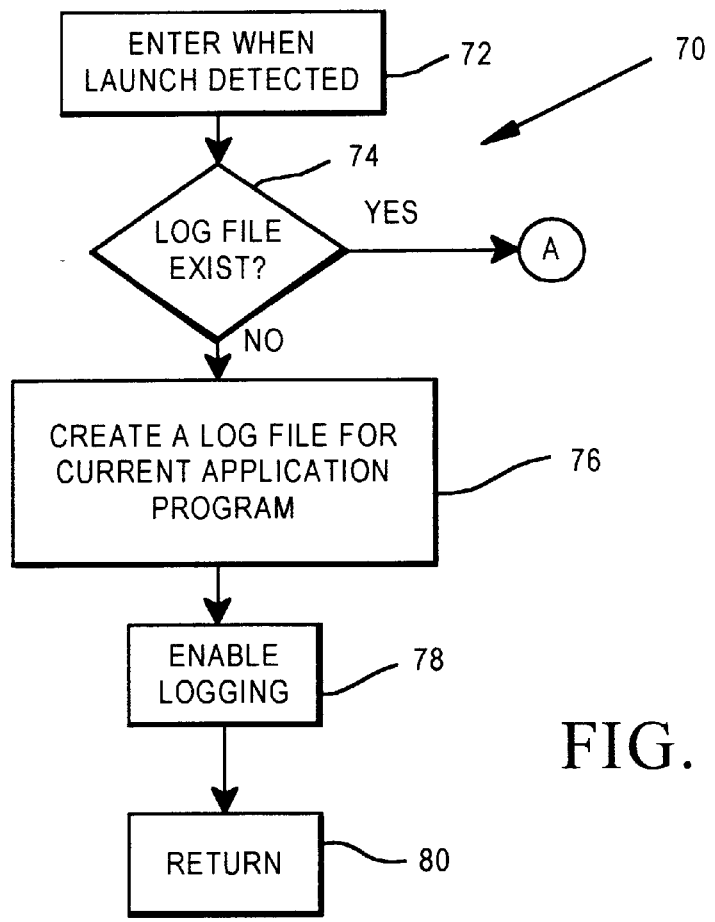
FIG. 3 is a flow chart of a process for creating a log file according to an embodiment of the method of this invention.

FIG. 3 is a flow chart 70 of one embodiment of the method for accelerating a program's launch sequence.

Launch Detection

The first step 72 in the method is to detect that a computer program is being launched. According to one embodiment an interrupt is generated each time a file is opened. The interrupt service routine in effect hooks into the operating system to determine that a program is being launched. Specifically, the interrupt service routine checks to see if the file is being opened with an "execute" privilege. If so, then such file is an executable file which is to be run. The contents of such file are executable object code instructions to be processed by the processor 12.

Figure 6:
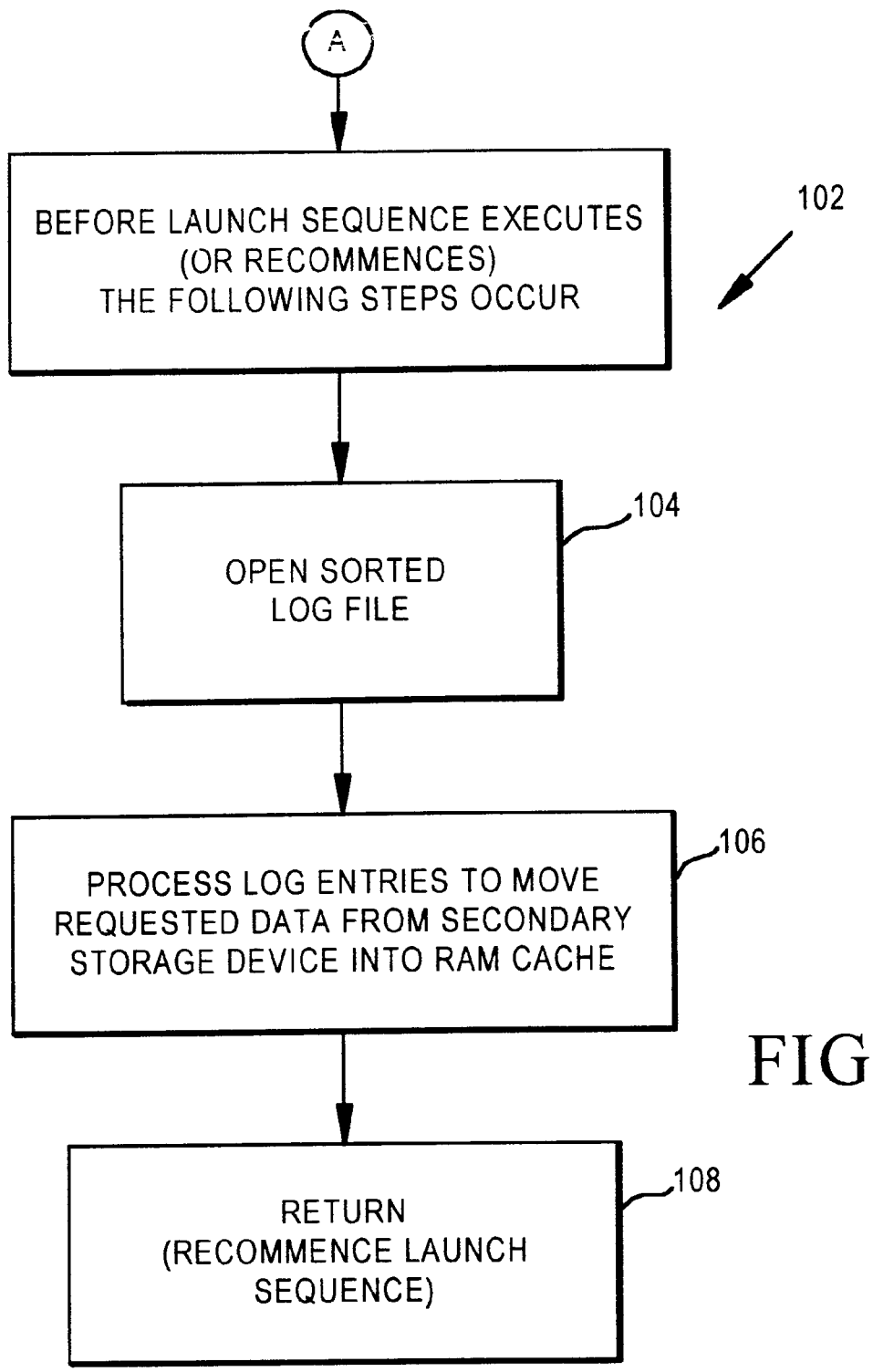
FIG. 6 is a flow chart of steps performed during subsequent launches of a computer program.

The interrupt service routine checks at step 74 to see if a log file already exists for the computer program being launched. If so, then the steps described with regard to FIG. 6 are performed. If not, then a log file is created at step 76.

The log file corresponds to a specific computer program—the one being launched that triggered such log file to be created. When multiple programs are being launched at the same time, a log file is created for each such program. The interrupt service routine then sets a flag at step 78 to indicate that logging is enabled for such program. At step 80 the program returns. If the trigger for calling the routine 70 was for a secondary storage device access, then the steps at FIG. 4 also are performed before returning.

Log File System Activity

Figure 4:
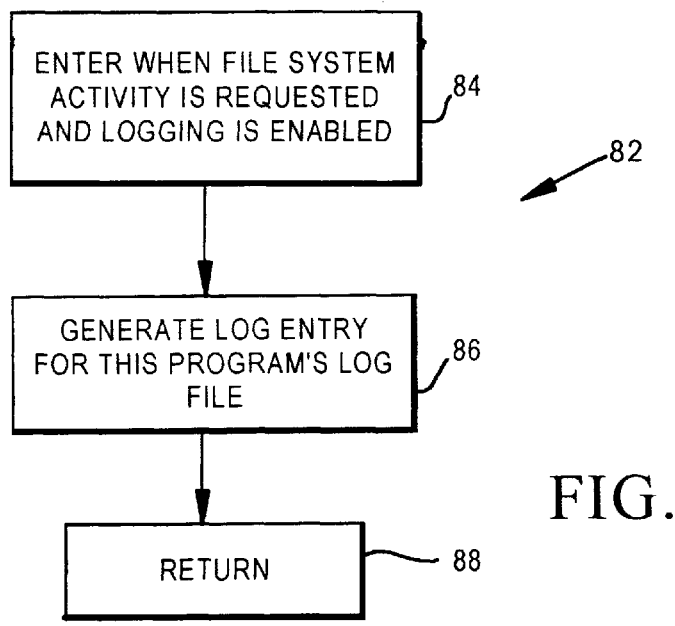
FIG. 4 is a flow chart of steps for generating log entries in the log file created by the steps of FIG. 3.

Once the launch of a computer program is detected and a log file is opened, all file system activity is monitored. Specifically, for each operating system call to the file system the call is analyzed to determine to which application being launched, if any, does the call pertain. Exemplary operating system calls to the file system are OPEN, READ, WRITE, and CLOSE. Referring to FIG. 4 routine 82 is entered at step 84 when both file system activity is detected and logging is enabled. If the call pertains to a computer program being launched, then an entry is appended to the appropriate log file (step 86). The routine 82 then returns at step 88.

The log entry includes a file identifier, the logical address (es) specified in the call and the time of access (e.g., system time; index value). Alternatively, the physical memory address(es) corresponding to the logical address(es) are stored in the log entry. In some embodiments, the operating system has already caused the physical addresses to be generated. If not, then the physical addresses are derived from the logical addresses using the operating system's file allocation table to translate the logical address into the physical address.

A logical address (also referred to as a virtual address) is the address which the computer program uses to access memory. A memory management unit translates this address into a physical address before the actual memory is read or written. A physical address is a memory location on the secondary storage device 16.

Listed below in Table B is a sample launch sequence for computer program 24 exemplified above in Table A:

TABLE B

| Order in Sequence | File | Address Blocks Encompassed |
| --- | --- | --- |
| a | File 1 | 24410–24500 |
| b | File 1 | 72210–72300 |
| c | File 3 | 29110–29200 |
| d | File 1 | 10010–10200 |
| e | File 2 | 61110–61200 |
| f | File 3 | 63010–63100 |
| g | File 2 | 64410–64600 |
| h | File 2 | 89010–89100 |
| i | File 1 | 59010–59100 |
| j | File 3 | 63110–63200 |
| k | File 2 | 32210–32400 |
| l | File 3 | 63210–63300 |

Detect Launch Completion

Figure 5:
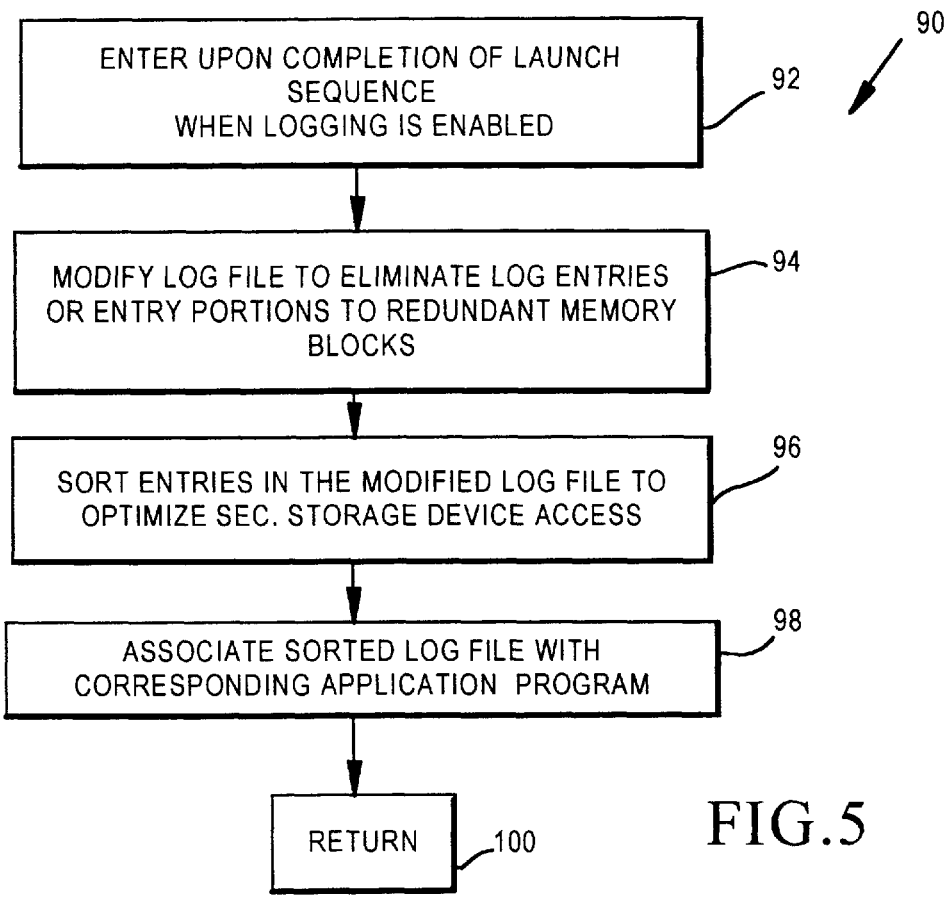
FIG. 5 is a flow chart of steps for modifying and sorting the log file.

When completion of a launch sequence occurs and logging is enabled, then routine 90 is executed. Referring to FIG. 5, the routine enters at step 92. Conventional operating systems have a specific function that is called when a program is ready for normal execution. Under the Macintosh operating system, the function "Get Next Event" is called. For a computer program running under such operating system, such function is called by the computer program when the launch sequence is complete. According to one embodiment of this invention, step 92 is implemented by an interrupt service routine which is called whenever a computer program calls such function. The interrupt service routine clears the logging enabled flag for the corresponding application program.

In an alternative embodiment, access activity to the secondary storage device 16 is monitored to determine when activity has ceased for a threshold length of time (e.g., 3 seconds). Alternatively or in addition activity is monitored to determine when activity has gone below a threshold data throughput rate (e.g., 50 kilobytes per second) for a threshold period of time (e.g., 5 seconds). When there is insufficient activity for such threshold time, then the program launch is considered to be complete. The routine 90 then is executed.

Modify and Sort Log File

Once the launch sequence is determined to have been completed, then the log entry order is re-organized. The purpose is to eliminate redundant accesses to the same memory block and to optimize access time for the secondary storage device. If accesses occur faster, then the launch time (i.e., time elapsed from start to finish of launch sequence is less) is reduced. Thus, the launch of the computer program is accelerated.

Referring to FIG. 5, at step 94 the log file is processed to eliminate log entries or log entry portions to redundant memory blocks.

Table 3 below shows a different example for a launch sequence for a computer program.

TABLE C

| Entry | File | Physical Address Blocks Encompassed |
| --- | --- | --- |
| a | File 1 | 24410–24500 |
| b | File 1 | 72210–72300 |
| c | File 3 | 29110–29200 |
| d | File 1 | 10010–10200 |
| e | File 2 | 61110–61200 |
| f | File 3 | 63010–63100 |
| g | File 2 | 64410–64600 |
| h | File 2 | 89010–89100 |
| h2 | File 1 | 10010–10100 |
| i | File 1 | 59010–59100 |
| i2 | File 3 | 63010–63100 |
| j | File 3 | 63110–63200 |
| k | File 2 | 32210–32400 |
| l | File 3 | 63210–63300 |
| l2 | File 1 | 24410–24500 |

Note in this example that the log includes redundant entries. Entry h2 is a subset of entry d. Entry i2 is the same as entry f. Entry l2 is the same as entry a. It is expected that a redundant access request results from a computer program launch sequence access specifying a different address in the same block as previously accessed.

Frequently the log file will include an entry specifying a single address. Even though only one address is specified, an entire memory block will be accessed (read or written). This is because the minimum file allocation unit is a memory block cluster. Thus, the smallest portion of the computer program than can be accessed is the cluster size (i.e., cluster size). Entries in the log file are tested at step 94 to identify any redundant accesses to portions of the computer program. To determine whether a later entry is an access to a redundant portion of the computer program, the cluster address for the access is identified. The cluster address is either stored in the log file or is derived from the address stored in the log file. For a FAT drive the cluster size is stored in the drive's boot sector. The boot sector includes information about the layout of the file system used for the drive partition. Following the boot sector are several reserved sectors. Following the reserved sectors is the file allocation table (FAT). Following the FAT are one or more backup copies of the FAT. Following the backup copies is the root directory. The size of the root directory is specified in the boot sector. After the root directory are the user's file and directory area. This is the area divided into clusters. Thus, from the information in the boot sector the starting address of cluster space is determined, along with the size of a cluster. Thus, the address boundaries for each cluster are known.

The address for any given cluster x is given by Ax+B, where A and B are constants determined from the boot partition. Thus, for any given file system call the cluster boundaries for such address are determinable. The log file stores either the accessed address, the cluster number (i.e., x) or the cluster address (e.g., start address, end address or some other identifying address) for each cluster accessed.

Following is a description of the redundancy testing. Consider the following access sequence: address 139, address 119, address 110, addresses 120–133, and addresses 138–140. Also consider that the memory block and cluster size is 10 addresses, and that blocks are located at 100–109, 110–119, 120–129, 130–139, 140–149. When address 139 is accessed the contents within the block of addresses 130–139 is accessed. For an embodiment which stores a starting address of the cluster as the cluster address, the log entry includes address 130. When address 119 is accessed the contents within the block of addresses 110–119 is accessed. The log entry for such access includes address 110. The next access in the launch sequence specifies address 110, causing the block 110–119 to be accessed. The cluster address is 110 which is already in the log. This access is a redundant access to a cluster already specified. The redundant access is eliminated by deleting the log entry for address 110. The next access specifies addresses 120–133. This access spans two clusters 120–129 and 130–139. The accesses are logged separately. The log entry for cluster address 120 is not redundant. The log entry for cluster address 130, however, is redundant because the first log entry for address 139 encompasses the memory block of addresses 130–139. To eliminate the redundancy, the log entry for address 139 is removed. The next access specifies addresses 139–140. This access also spans two clusters with two log entries. The first of the two is for cluster 130–139. This is a redundant entry and thus is removed from the log fie. The second of the two entries is for cluster 140–149. This is a nonredundant access. When the end of the log file is reached then redundancy testing (step 94) is complete.

In many instances the redundant accesses are eliminated from consideration by a cache operation performed by the computer instead of by step 94. Specifically, when caching is performed the second access to the same cluster will not result in a call to the hard drive because the data is in the cache. The cache will satisfy the request. Requests satisfied by the cache are ignored for purposes of creating a log of accesses. Thus, redundant entries do not get logged.

The modified log file next is sorted at step 96. In one embodiment the log entries are grouped according to the file. Each access resulting in a log entry specifies a file and an address. All entries for a given file are grouped together, then arranged within the group by logical address. The groups are arranged chronologically according to which file is specified first in the log file. Alternatively other criteria for ordering the groups is used. In an alternative embodiment instead of grouping the entries by file, all the log entries are sorted according to physical address to optimize access time to the secondary storage device 16. In one embodiment the log entries define a queue processed according to the methods disclosed in U.S. patent application Ser. No. 08/656,372 filed May 31, 1996 for "Estimating Access Time for Hard Drive I/O Requests." The contents of such application are incorporated herein by reference and made a part hereof. The log entries are rearranged in an order to optimize access time as described therein.

At step 98 the sorted log file is closed and stored. Such log file is associated with the computer program whose launch sequence is logged. At step 100, the routine returns.

Subsequent Processing

Subsequent launches of the computer program after a log file is created and sorted result in step 74 of routine 70 (See FIG. 3) branching to the routine 102 in FIG. 6. The steps of this routine 102 are executed once a computer program launch sequence is detected. The routine interrupts the launch sequence and is processed before recommencing the launch sequence. At step 104, the sorted log file for the computer program being launched is opened. At step 106, the entries in the log file are processed by generating a secondary storage device I/O request for each entry in the order the entries occur within the log file. This causes the memory blocks specified in the log file to be moved into the RAM cache 15. At step 108, the routine 102 returns. The launch sequence then recommences. As the I/O requests are generated during the remainder of the launch sequence, each request results in a hit in the RAM cache. Thus, launch time is reduced by eliminating redundant accesses and performing the accesses in an optimal order.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for reducing launch time for a computer program, wherein the computer program comprises a plurality of files stored on a secondary storage device, each one of the plurality of files stored in a plurality of physical addresses encompassing at least a portion of a physical address block of the secondary storage device, a physical address block being a minimum unit of physical addresses on the secondary storage device copied to a primary storage device, the method comprising the steps of:

detecting that a computer is executing a launch sequence for initializing the computer program, wherein during the launch sequence, contents of physical address blocks of the secondary storage device at which portions of the computer program are stored are copied to the primary storage device;

logging accesses to the secondary storage device during the computer program launch sequence, wherein a log entry is generated in sequence for each access to a physical address block at which a portion of the computer program is stored, and wherein the sequence of log entries corresponds to an access order of portions of the computer program;

detecting that the launch sequence is complete;

altering the log file to eliminate duplicate accesses to the same physical address block;

reordering the remaining log entries in the altered log file to generate a final log file, wherein the remaining log entries are reordered to reduce access time for performing secondary storage device accesses;

detecting a subsequent launch of the computer program;

before completing the subsequent launch, processing the final log file to move the memory blocks specified in the final log file into a RAM cache so that during recommencement of the subsequent launch data specified in secondary storage device access requests are present in the RAM cache.

2. An apparatus for reducing launch time for a computer program, comprising:

a first processor for executing a launch sequence of the computer program;

a RAM cache serving as a primary storage device accessed by the first processor;

a secondary storage device for permanently storing the computer program, wherein the computer program comprises a plurality of files stored on the secondary storage device, each one of the plurality of files stored in a plurality of physical addresses encompassing at least a portion of a physical address block of the secondary storage device, a physical address block being a minimum unit of physical addresses on the secondary storage device copied to a primary storage device;

means for detecting that the first processor is executing a launch sequence for initializing the computer program, wherein during the launch sequence, contents of physical address blocks of the secondary storage device at which portions of the computer program are stored are copied to the primary storage device;

means for logging accesses to the secondary storage device during an initial computer program launch sequence, wherein a log entry is generated in sequence for each access to a physical address block at which a portion of the computer program is stored, and wherein the sequence of log entries corresponds to an access order of portions of the computer program;

means for detecting that the launch sequence is complete;

means for altering the log file to eliminate duplicate accesses to the same physical address block;

means for reordering the remaining log entries in the altered log file to generate a final log file, wherein the remaining log entries are reordered to reduce access time for performing secondary storage device accesses;

means for detecting a subsequent launch of the computer program; and means for processing the final log file, before completing the subsequent launch, to move the memory blocks specified in the final log file into a RAM cache so that during recommencement of the subsequent launch data specified in secondary storage device access requests are present in the RAM cache.

* * * * *